J. GAINEY.
Combined Filter and Supply Pipe.
No. 219,931. Patented Sept. 23, 1879.
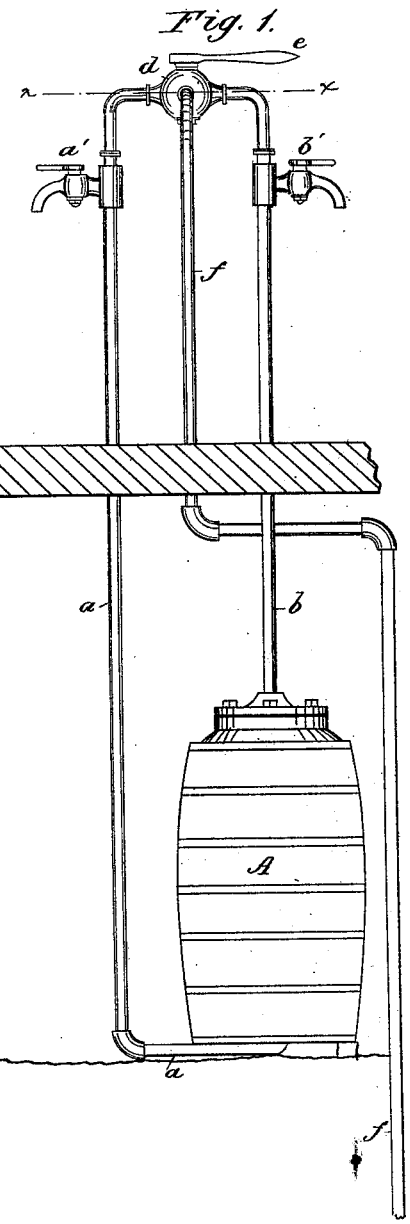
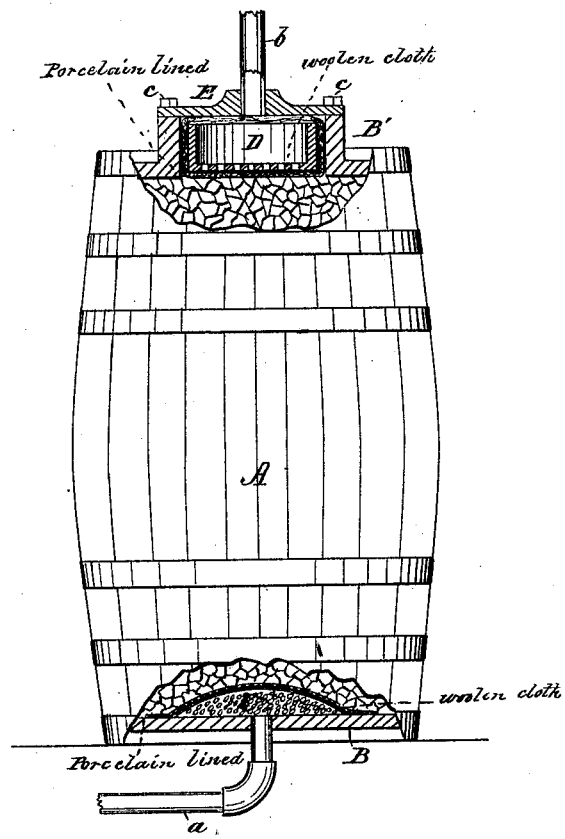
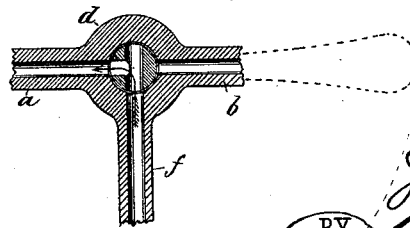
WITNESSES:
W. W. Hollingsworth
Edw. W. Byrn
INVENTOR:
Jas. Gainey
BY
ATTORNEYS.

UNITED STATES PATENT OFFICE.

JAMES GAINEY, OF AUGUSTA, GEORGIA.

IMPROVEMENT IN COMBINED FILTER AND SUPPLY-PIPE.

Specification forming part of Letters Patent No. 219,931, dated September 23, 1879; application filed July 22, 1879.

*To all whom it may concern:*

Be it known that I, JAMES GAINEY, of Augusta, in the county of Richmond and State of Georgia, have invented a new and Improved Combined Filter and Supply-Pipe; and I do hereby declare that the following is a full, clear, and exact description of the same, reference being had to the accompanying drawings, forming part of this specification, in which—

Figure 1 is a side elevation of the apparatus as applied in a building. Fig. 2 is an enlarged sectional view of the filter. Fig. 3 is a section through the line $x\ x$ of Fig. 1, showing the construction of the three-way cock.

My invention relates to certain improvements in the arrangement of a filter with respect to the supply-pipe of a house, and also in the construction of the filter.

It consists, first, in so combining a filter with a three-way cock by means of connecting-pipes that filtered or unfiltered water may be drawn from the same locality and at any part of the house.

It also consists in constructing the body of the filter in the form of a wooden barrel strongly hooped and charred upon the inside, and combining therewith cast-iron heads enameled upon the inside, so that the purity of the water may not be contaminated by remaining in the filter, all as hereinafter more fully described.

In the drawings, A represents the filter, which may be located at any suitable place, but which is preferably arranged in the cellar, as shown. The body of the filter is made, like a barrel, of wood, and is strongly hooped, so as to stand any desired pressure from thirty to two hundred pounds. This wooden body effects a saving of fifty per cent. over the old galvanized cylinder, and its inside surface is thoroughly charred by burning, so that the water may not taste of the wood, but may rather be purified by the same.

B B' are the top and bottom heads of the filter, which are made of cast-iron, and are enameled or porcelain-lined on the inside, so as to prevent the water from having any contact with metal in the filter. Opening through the heads of the filter are the pipes $a$ and $b$. Over the pipe $a$, which enters at the bottom, is arranged a dished and perforated sheet-metal cover, C, over which is placed a layer of woolen cloth, and upon which cloth is then packed the charcoal which I employ as a filtering medium.

In the upper head of the filter is formed an opening, in which is contained a perforated cup, D, beneath whose bottom is secured a piece of woolen cloth, whose edges are secured between the cup and the inner edges of the head. Fitting closely over this cup is the plate E, secured to the cast-iron head by bolts $c$. The two pipes $a$ and $b$ extend from the filter to any desired part of the house—to the first floor above the cellar, for instance, as shown in the drawings. Here they are each provided with a bib-cock, $a'\ b'$, and then connect with a three-way cock, $d$, one of whose ways communicates with pipe $a$, another, upon the opposite side, with the pipe $b$, and whose middle way communicates with the inlet-supply pipe $f$, which brings the water from the street-main.

Now, when the handle $e$ of the plug is turned to the right, as shown in full lines in Fig. 1 and dotted lines in Fig. 3, the supply-pipe $f$ and pipe $a$ are in direct communication, and the unfiltered water passes through $a$ to the filter, down through the filter, to be purified, and up through pipe $b$ to the bib $b'$. It will thus be seen that with this position of the three-way cock there may be drawn at this locality either unfiltered water through the bib $a$, or pure filtered water at the bib $b'$.

Now, if the handle of the three-way cock be thrown to the left the supply-pipe $f$ and pipe $b$ are then in direct communication, and the unfiltered water passes down $b$ and in the reverse direction through the filter, thence through $a$ to the bib $a'$. In this position it will be seen that unfiltered water may be drawn at the bib $b'$ and pure filtered water at $a'$, thus putting it in the power of the user to get through the same pipes either an abundant and unimpeded supply of unfiltered water for scouring and other work not requiring pure water, or pure water for drinking, cooking, or washing fine clothes.

By stopping the handle of the three-way cock in the middle, or at half of its full adjustment, the water is entirely cut off from the filter, and this feature renders the device specially valuable when filters are used in connection with the Holly system of water-supply, where the great pressure required in case of fire would burst the filter.

By attaching branch pipes to the pipes *a* and *b* and extending them through the house this double use of pure and unfiltered water may be made available all over the house.

The benefit arising from the reversal of the flow is the automatic cleansing of the filter.

In defining my invention more clearly, I would say, with respect to the feature of the three-way cock, that I do not claim it, broadly, in connection with a filter, as it has been used heretofore for cutting off the water from the filter and reversing the current through the same, as shown in the patent No. 188,274. I do not know, however, that a three-way cock has ever been arranged in connection with the inlet and outlet pipe from the filter and the supply-pipe, as shown, which arrangement permits pure or unfiltered water to be drawn at any part of the house and from the same locality at the same time.

Having thus described my invention, what I claim as new is—

1. The combination of a filter and a three-way cock with two pipes communicating with the opposite ends of the filter and leading to opposite sides of the three-way cock, and a third inlet-supply pipe connecting with the three-way cock at a point intermediate to the entering point of the pipes connecting with the filter, whereby the three-way cock may be placed remote from the filter and filtered or unfiltered water drawn at the same time from the same locality, substantially as shown and described.

2. A filter composed of wooden staves charred upon the inside and strongly banded together by hoops, in combination with cast-iron heads, enameled or lined with porcelain upon the inside, and having pipe-connections for the inflow and discharge, substantially as described.

JAMES GAINEY.

Witnesses:
NATHAN DAVIS,
W. W. BARRON.